US008065978B2

(12) United States Patent
Duncan et al.

(10) Patent No.: US 8,065,978 B2
(45) Date of Patent: Nov. 29, 2011

(54) SYSTEM AND METHOD FOR TRACKING, MONITORING, AND LOCATING ANIMALS

(75) Inventors: Timothy T. Duncan, Tucson, AZ (US);
Sean M. Hayes, Tucson, AZ (US);
Francisco J. Napolez, Tucson, AZ (US);
David T. Whetten, Sahuarita, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 233 days.

(21) Appl. No.: 12/477,067

(22) Filed: Jun. 2, 2009

(65) Prior Publication Data
US 2010/0139575 A1 Jun. 10, 2010

Related U.S. Application Data

(63) Continuation-in-part of application No. 11/835,412, filed on Aug. 7, 2007, now Pat. No. 7,819,087.

(60) Provisional application No. 60/821,919, filed on Aug. 9, 2006.

(51) Int. Cl.
*A01K 29/00* (2006.01)

(52) U.S. Cl. ........................................................ 119/721

(58) Field of Classification Search .................. 119/174, 119/201, 702, 712, 719, 905
See application file for complete search history.

(56) References Cited

U.S. PATENT DOCUMENTS

| | | | |
|---|---|---|---|
| 3,935,443 A | 1/1976 | Simmons | 240/6.4 |
| 4,173,201 A | 11/1979 | Chao et al. | 119/106 |
| 4,887,552 A | 12/1989 | Hayden | 119/109 |
| 4,895,110 A | 1/1990 | LoCascio | 119/106 |
| 4,909,189 A | 3/1990 | Minotti | 119/106 |
| 5,046,456 A | 9/1991 | Heyman et al. | 119/106 |
| 5,140,946 A | 8/1992 | Pennock et al. | 119/106 |
| 5,392,735 A * | 2/1995 | Xitco et al. | 119/712 |
| 5,443,036 A * | 8/1995 | Amiss et al. | 119/707 |
| 5,450,063 A * | 9/1995 | Peterson et al. | 340/573.2 |
| 5,515,033 A | 5/1996 | Matarazzo | 340/573 |
| 5,523,927 A | 6/1996 | Gokey | 362/103 |
| 5,630,382 A | 5/1997 | Barbera et al. | 119/859 |
| 5,967,095 A | 10/1999 | Greves | 119/795 |
| D417,039 S | 11/1999 | Smith et al. | D30/152 |
| 6,055,942 A | 5/2000 | Romanak et al. | 119/859 |
| 6,116,983 A * | 9/2000 | Long et al. | 446/227 |
| 6,170,439 B1 | 1/2001 | Duncan et al. | 119/720 |
| 6,394,040 B1 | 5/2002 | Axel | 119/859 |
| 6,578,527 B1 * | 6/2003 | Mathers | 119/707 |
| D515,251 S | 2/2006 | Silverlieb | D30/152 |
| 7,008,075 B2 | 3/2006 | Simoni | 362/108 |
| 7,066,780 B2 * | 6/2006 | Jamison | 446/219 |
| 7,140,327 B2 | 11/2006 | Morehead | 119/859 |
| 7,198,009 B2 | 4/2007 | Crist et al. | 119/718 |
| 7,252,051 B2 | 8/2007 | Napolez et al. | 119/718 |
| 7,367,285 B2 | 5/2008 | Cooper | 119/795 |
| 2006/0162674 A1 | 7/2006 | Neiser | 119/795 |
| 2007/0039563 A1 | 2/2007 | Keller | 119/799 |
| 2007/0103890 A1 | 5/2007 | Morehead | |
| 2008/0036594 A1 | 2/2008 | Kates | 340/541 |

* cited by examiner

*Primary Examiner* — Richard Price, Jr.
(74) *Attorney, Agent, or Firm* — Samuel M. Korte

(57) ABSTRACT

A light accessory is provided for a remotely controlled animal training system, allowing visual tracking of an animal in low ambient light conditions. The light accessory may be a stand-alone accessory or be in conjunction with a wireless receiver. The light accessory may be controlled by an accessory channel that exists in the remotely controlled animal training system, or may be controlled by the presence of a generic proximate radio frequency transmission.

36 Claims, 10 Drawing Sheets

SYSTEM AND METHOD FOR TRACKING, MONITORING, AND LOCATING ANIMALS

CROSS REFERENCE TO RELATED APPLICATION

This application is a continuation in part of U.S. patent application Ser. No. 11/835,412 filed Aug. 7, 2007, now U.S. Pat. No. 7,819,087 which claims priority to Provisional Application No. 60/821,919, filed Aug. 9, 2006 the contents of each of which are incorporated herein by reference.

FIELD OF THE INVENTION

The present invention relates generally to animal training systems, and more particularly to a light accessory for electronic animal training systems. The invention has particular utility in connection with dog tracking systems, which may be used alone or in combination with a remote dog training system, and will be described in connection with such utility, although other utilities are contemplated.

BACKGROUND OF THE INVENTION

The invention relates to systems for animal training and tracking, and more particularly to an improvement and accessory for animal training systems to allow for visual tracking of an animal in low ambient light situations.

While a number of devices are known for remotely stimulating dogs and other animals for training purposes, it is difficult to track such animals if they are off-leash and moving far afield. In fact, dogs may be lost during training exercises or competitions should they wander too far from the owner or trainer. In this situation, not only may a prize animal be lost, but also so would the expensive training collar being worn by the animal. These problems are particularly acute in low lighting conditions.

Animal lighting apparatuses are known. For example, U.S. Pat. No. 4,173,201, issued to Chao et al. on Nov. 6, 1979, discloses an illuminated collar including small electric lamps powered by a dry cell battery and disposed along an elongated leather strap. A manually operated switch carried on the collar for operation of the lights. U.S. Pat. No. 3,935,443, issued to Allen P. Simmons on Jan. 27, 1976, discloses an illuminated collar, which includes a plurality of miniature filament lamps connected in parallel. A battery is disposed along the length of the collar which, when secured in its container, completes an electrical circuit to provide power to the lights. U.S. Pat. No. 5,523,927, issued to James A. Gokey on Jun. 4, 1996, discloses a collar for placement on an animal including a light emitting diode, a motion sensitive switch designed to respond to the motion of the animal, an on/off switch to selectively turn the battery power to the circuit, a battery and a timing circuit. U.S. Pat. No. 7,140,327, issued to Sondra Morehead on Nov. 28, 2006, discloses a collar with an illumination source in communication with a light emission inset through light transferring fibers. The illumination source may be manipulated with a control mechanism in communication with the illumination source through a radio frequency transceiver, or possibly an infrared link or other wireless technology. A person may activate the illumination source remotely without the necessity of capturing the animal prior to activating the illumination source.

While the above patents generally disclose an illuminated pet collar or harness, the references require the lighting on the collar to be switched on or off manually. The constant on position of the light source rapidly depletes the energy source for the lighting. Also, the above references do not disclose a light attachment that may be added to an existing wireless training system.

Thus, there is an unmet need for an improved remote training device that reliably provides a remote training device that (1) provides maximum selectability of the intensity of stimulus applied to the animal, (2) achieves very reliable, repeatable electrical contact of the electrodes with the animal's skin over the entire desired range of selectable stimulus intensity settings, and (3) allows for selective illumination of the animal in low lighting conditions to allow greater visibility to the owner.

The present invention provides improvements over the above prior art and other existing animal illumination systems.

SUMMARY OF THE INVENTION

Accordingly, it is an object of the invention to provide a remote control animal training system that overcomes the aforesaid and other disadvantages of the prior art.

It is another object of the invention to provide a remote animal training system with a reliable way for a trainer to monitor whether an animal is moving or motionless when the animal is out of sight and/or to allow the trainer to better locate an animal in low lighting conditions.

It is another object of the invention to provide a remote animal training system that allows visual identification of an animal by a trainer or third party so that animals running off-leash with the device may avoid a vehicle-animal accident since the operator of the vehicle may see them.

Briefly described, and in accordance with one embodiment thereof, the invention provides a system and method for coupling a light accessory to a receiver that is responsive to a transmitter. A command to selectively illuminate a light accessory incorporated into the animal training system is transmitted to the receiver. The received information is demodulated in the receiver to produce a signal representative of the requested lighting status. A microprocessor in the receiver receives and operates on the signal to generate and transmit to the accessory via a low frequency communication channel an output of predetermined duration to light the light accessory.

In one embodiment, the light function is activated and controlled using a RFID function of a transmitter with an associated accessory. An RFID signal is transmitted by an antenna on a transmitter to an accessory receiving antenna and detected by a microcontroller. The received signal is demodulated to create instructions for the accessory device. The RFID signal transmitted to the accessory activates the light when the RFID transmitter is in close range with the accessory.

Accessory light devices may perform a variety of functions. For example, a Locate Feature may be encoded wherein the device will flash when the transmitter is set to accessory setting and a button is pressed. The Locate Mode may instruct the LED units of the device to continuously shine at its highest intensity. The light accessory may be coupled with an infrared (IR) LED for more effective use in the K9 protection functionalities.

In another embodiment, the LEDs may be customized to emit a specific color to allow for multiple dog usage. Further, the LED flash rate, or color, or both may be used for identifying a particular animal. The flash rate, color, or other element of the device may be coupled to, for example, a motion sensor, accelerometer, heart rate monitor, electronic compass or GPS system to indicate to a user whether the animal is in motion, being motionless (pointing), or treeing an animal. A secondary benefit is that the LED provides light to the tree where the dog is baying. In a particular embodiment, a pressure sensor is added to the neck of an animal such as a horse to monitor cribbing or foaling, and provide feedback information to the user. An electronic compass or GPS module may also be used in the accessory unit and coupled to the device such that the flash rate or color will indicate direction or orientation of an animal.

In addition to a light accessory, sound, vibration and other modules may be provided that draw power from an existing power supply and receive instructions via an RFID function of a transmitter. This allows a trainer or owner to add functionality onto an animal training product they have already purchased in an economical fashion.

Furthermore, modules for data collection applications, use in areas related to environments where a human cannot go such as search & rescue, crime scenes, etc. may be provided using the method and apparatus of the invention. In a particular embodiment, a module could hold medical supplies to aid with rescues.

In yet another embodiment of the invention, there is provided a remotely controlled animal training system having a transmitter including a control apparatus for selectively transmitting a signal to a collar mounted receiver, said transmitter and receiver each having a battery, said receiver further including a light source and a connection to couple the light source to the battery of the receiver;

a control to selectively power the light source and to enable various lighting patterns.

In still yet another embodiment of the invention, there is provided an accessory unit for a remotely controlled animal training system having a battery and a receiver, comprising:

a functional unit;

a connection to couple the functional unit to the battery of the animal training system and;

a control to selectively power and enable the functional unit.

The functional unit may comprise, for example, a sensor unit including but not limited to a temperature sensor, a moisture sensor and a biometric sensor, a GPS unit, and a compass.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1A:
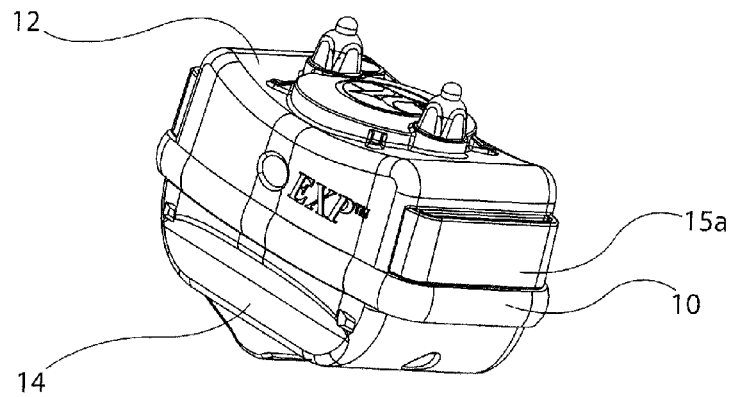
FIG. 1A is a perspective view of a receiver of an animal training system including a light accessory of the present disclosure.
Figure 1B:
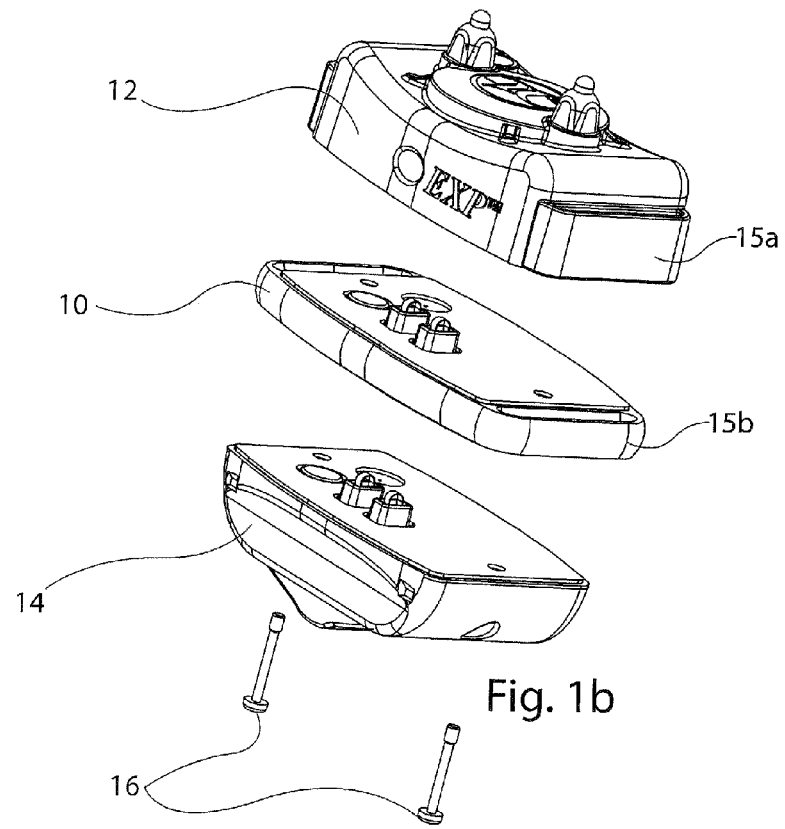
FIG. 1B is an exploded view of the receiver of FIG. 1A.

Referring to FIGS. 1A and 1B, in one embodiment, a light accessory 10 on an animal training system is activated by an accessory function in a receiver 12 of the animal training system. The light accessory or other accessory 10 is coupled to the existing battery 14 and is controlled by receiver 12 and shares power from the battery unit 14 of the animal training system. The receiver 12 and accessory 10 each have a collar strap tab 15a, 15b. Thus, if the collar strap tab of the receiver were to break or fail, the collar strap tab of the accessory will continue to secure the receiver and accessory to the animal, and vice versa. In a particular embodiment, the light accessory 10 comprises two or more high intensity light emitting diodes (LEDs) on board. LEDs are commercially available, such as, for example, Everlight Reference Part No. 99113UTC/1318507/TR8. The luminous intensity of the LEDs is preferably greater than about 800mCD. The housing for the light module accessory 10 is transparent and may include reflective material to maximize light visibility.

Figure 2:
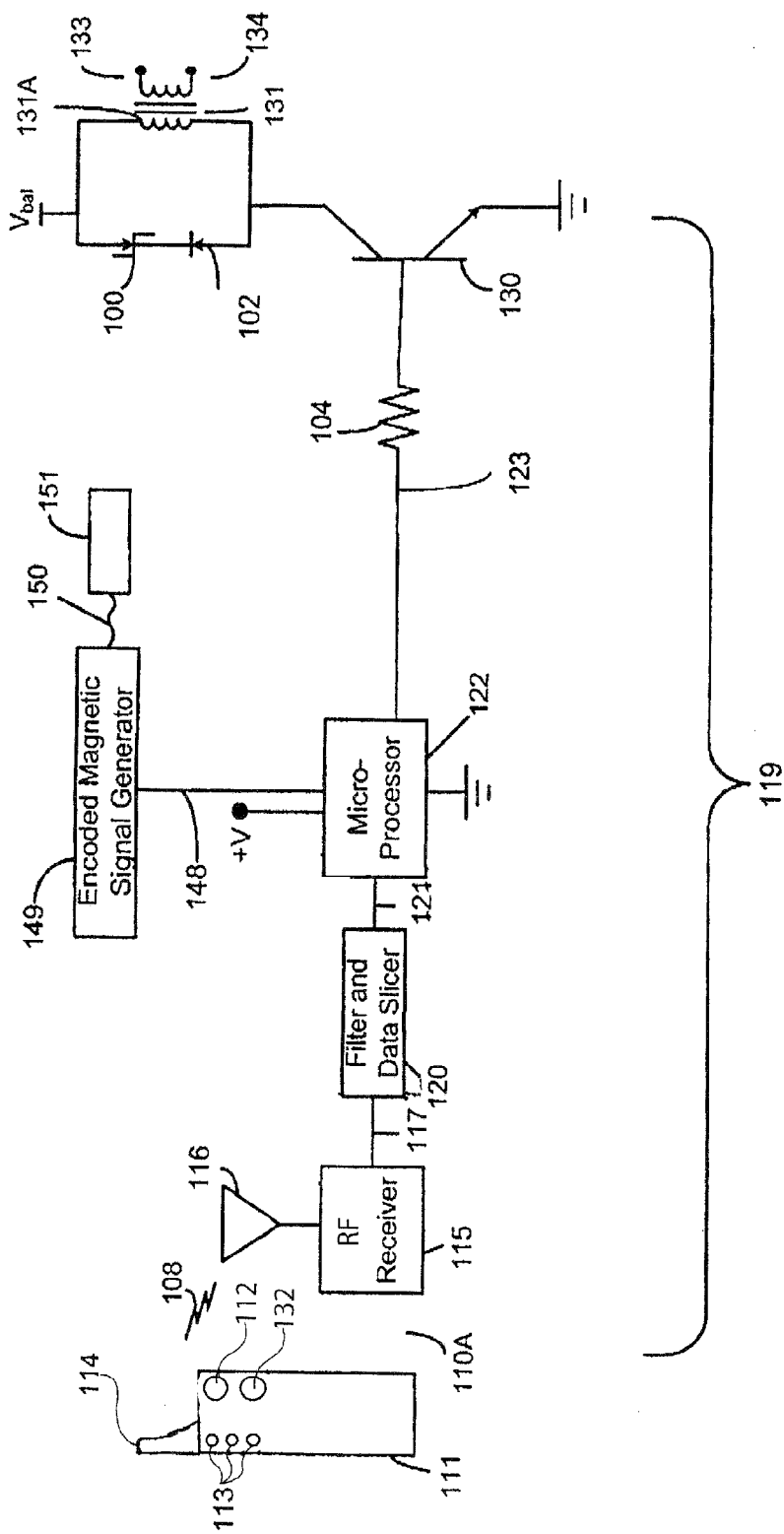
FIG. 2 is a block diagram of a remote animal training system, in accordance with an embodiment of the present disclosure.

FIG. 2 is a block diagram of a remote animal training system 110A, in accordance with a first exemplary embodiment of the present invention. The remote training system 110A includes a remote transmitter 111 having several push-button switches 113 for setting a stimulus level code that selects one of for example, three to six desired electrode stimulus signal levels. The stimulus level selected is digitally encoded into an RF signal 108. The RF signal 108 is transmitted by a remote antenna 114 on the remote transmitter 111 to a collar antenna 116 and detected by an RF receiver 115. The receiver output 117 of the RF receiver 115 is demodulated by a demodulator 120 to produce a digital output 121. The digital output 121 of the demodulator 120 represents the stimulus code/data selected by push-button switches 113 of remote transmitter 111. The digital output data 121 is translated by a microprocessor 122 into one of six or more possible stimulus level selection signals 123. The stimulus level selection signal 123 may be a pulse width signal having one or more pulses, each pulse having a substantially similar width. Intensity selector switch 112 provides a plurality of settings, e.g. six or more settings for selecting from one of several, e.g. six or more available intensity levels. Switches 113 allow the user to select between several functions/types of stimulus such as momentary or continuous stimulation, e.g., light, sound, electric stimulation (shock), or vibrations, and low, medium, or high stimulation by pressing one or more switches.

Figure 3:
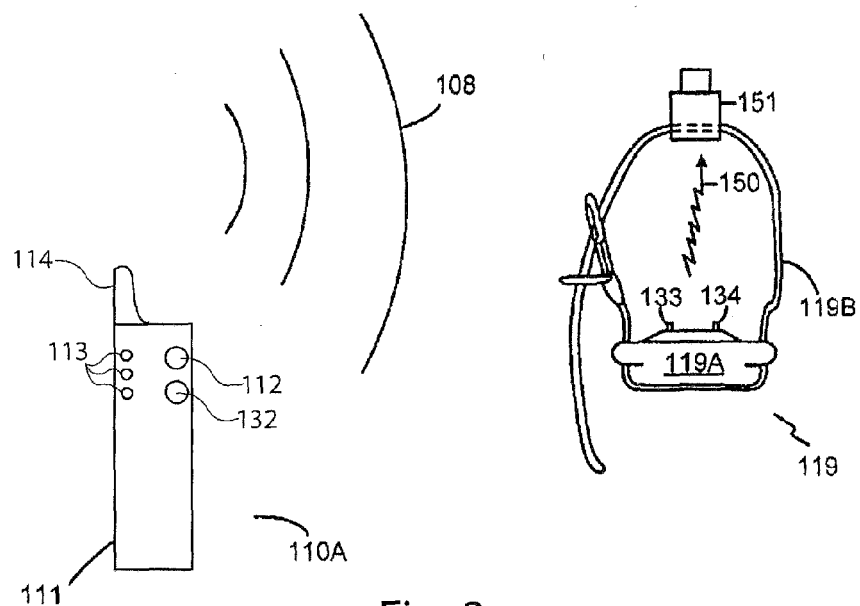
FIG. 3 is a block diagram of the remote animal training system of FIG. 2, in accordance with an embodiment of the present invention.

Referring to FIG. 3, another embodiment, the remote animal training system 110A includes a remote transmitter 111 having several push-button switches 113 for setting a stimulus level code that selects one of for example, three to six or more desired electrode stimulus signal levels. The stimulus level selected is digitally encoded into an RF signal 108. A remote antenna 114 on the remote transmitter 111 transmits the RF signal 108 to a collar-mounted receiver unit 119 carried by the animal. The receiver unit 119 includes an RF receiver and an (LF) magnetic coupling transmitter 119A (FIG. 3) attached to a collar 119B (FIG. 3). An accessory magnetic coupling receiver device 151 (e.g., a beeper, light, or similar) also may be attached to the collar 119B or integrated into the receiver unit 119. The receiver unit 119 may receive signals from the remote transmitter 111 corresponding to electric stimulus levels and a light selection. At least two electrodes 133 and 134 of the transceiver unit 119 electrically contact the skin of the animal and apply thereto stimulus signals the intensity of which is in accordance with the RF signal 108 sent from the remote transmitter 111.

A switch or a setting on an ISS knob 132 on the remote transmitter 111 may actuate the collar-mounted accessory device 151. Upon actuation of the switch or knob 132, the collar mounted accessory device 151 receives a signal from the LF transmitter in the RF receiver unit 119A to produce an audible and/or visual signal, e.g., a strobe that enables the trainer to audibly/visually determine if the animal is moving or is motionless, e.g., "pointing" or for purposes of locating. The signal transmitted from remote transmitter 111 to the RF receiver/LF transmitter 119A may be approximately 27 MHz (RE), for example, and the signal from the receiver/transmitter 119A to the collar-mounted accessory device 151 may be approximately 125 KHz (LF) for example. Accessory device may be replaced with lighting accessory 10 as shown in FIG. 1. The light accessory may perform a variety of functions. For example, a LOCATE FEATURE may be encoded wherein LED 186 (see FIG. 5) will flash when the transmitter is set to an accessory setting and a button is pressed. The Locate Mode may instruct the LED units of the device 186 (FIG. 5) to continuously shine at its highest intensity.

In another embodiment, the LEDs 186 may be customized to emit a specific color to allow for multiple dog usage. Further, the LED flash rate, or color, or both may be used for identifying a particular animal. The flash rate, color, or other element of the device may be coupled to, for example, a motion sensor, accelerometer, heart rate monitor, electronic compass or GPS system (not shown) to indicate to a user whether the animal is in motion, motionless (pointing), or treeing an animal. In a particular embodiment, a pressure sensor is added to the neck of an animal such as a horse to monitor cribbing or foaling and provide feedback information to the user. An electronic compass or GPS module also may be used in the accessory unit and coupled to the device such that the flash rate or color will indicate direction or orientation of an animal.

The intensity selector switch 112 on the remote transmitter 111, which may be a rotary switch, may be used to select "zero" level or any one of for example, six or more desired output levels of the pulses of stimulus voltage $V_o$ produced by the Flyback transformer 131 (FIG. 2). The several push button switches 113 can be depressed individually or in combination to select the frequency and number of the pulses of stimulus voltage signal $V_o$. The intensity selector switch 112 may be adapted to adjust the accessory module. For example, the intensity selector switch 112 may adjust the light intensity, flash rate, color, or other aspect of the light module, or the volume, frequency, or other aspect of a sound module etc.

FIG. 3 is a block diagram of the remote animal training system 110A of FIG. 2, in accordance with another embodiment of the present invention. The remote training system 110A includes the remote transmitter 111 having several push-button switches 113 for setting a stimulus level code that selects one of the stimulus signal levels. The stimulus signal level selected is digitally encoded into an RF signal 108. The RF signal 108 is transmitted by a remote antenna 114 on the remote transmitter 111 to a collar antenna 116 (referring back to expanded receiver 119 in FIG. 2) and detected by an RF receiver 115. The collar antenna 116 and the RF receiver 115 are part of the collar-mounted receiver unit 119 carried by the animal.

The receiver output 117 of the RE receiver 115 is connected to the input of a filter and data slicer circuit 120, which may be separate or part of a microprocessor 122. An output signal of the filter and data slicer/comparator circuit 120 provides a digital output 121, a serial digital encoded signal that becomes a data input to the microprocessor 122. Filter and data slicer/comparator circuit 120 is a conventional circuit that filters and shapes the signals produced from the RF receiver 115 to generate the digital output 121 as an input to the microprocessor 122.

The microprocessor 122 supplies a stimulus level select signal 123 that includes a pulse width modulated stream of output pulses. Each of the output pulses in the stimulus level selection signal 123 for any one stimulus level selection have a substantially similar width, although pulse widths may differ between different stimulus level selections. The stimulus level selection signal 123, which includes pulse-widths of which correspond to the stimulus levels selected by the intensity selector switch 112 of the remote transmitter 111.

The stimulus level selection signal 123 is applied through the resistor 104 to a control electrode of a switch transistor 130 connected to a primary winding 131A of a Flyback transformer 131 and a diode 102 in series with a Zener or TVS diode 100. The Zener or TVS diode 100 may have a response time of less than 8 microseconds. The peak-to-peak voltage produced between the pair of electrodes 133 and 134 connected to the secondary winding terminals of the Flyback transformer 131 corresponds to the pulse width of the drive pulses, and hence to the stimulus level selected by pushbutton switches 113 of the remote transmitter 111.

When a Flyback signal is produced on the primary winding 131A of the Flyback transformer 131, the Zener or TVS diode 100 suppresses the voltage to the primary side. On the primary side, when a signal occurs at the collector of the switch transistor 130, the diode 102 biases the primary winding 131A of the Flyback transformer 131 thereby allowing the Flyback transformer 131 to be energized to the proper level for signal delivery to a load and preventing minimal, if any, current flow through the Zener diode 100. When the transistor 130 is switched "OFF", the Zener diode 100 charges, thereby delivering the "Flyback signal" across the transformer 131 at an acceptable voltage. The voltage suppression effectuated by the Zener diode 100 that occurs on the primary side corresponds to an open-circuit peak voltage suppression level.

Figure 4:
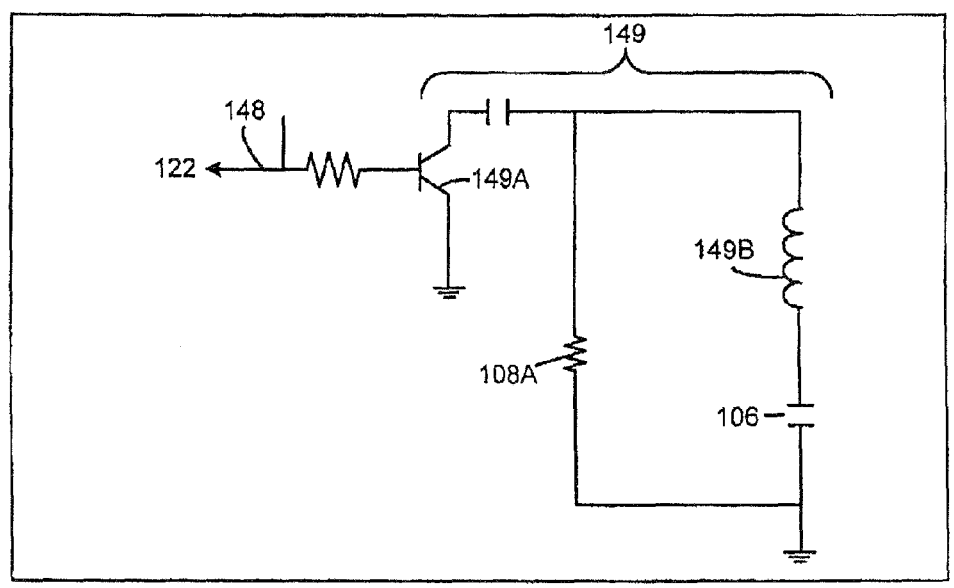
FIG. 4 is a circuit diagram of an element of the remote animal training system of FIG. 2, in accordance with an embodiment of the present invention.

FIG. 4 is a circuit diagram of an element of the remote animal training system 110A of FIG. 2, in accordance with the second exemplary embodiment of the present invention. The microprocessor 122 (shown in FIG. 4) provides a digital signal via conductor 148 to an encoded magnetic signal generator circuit 149. Using a magnetic signal is beneficial in that it is easy to comply with FCC regulations, but those having ordinary skill in the art will recognize other types of signal generators may be relied upon for the same purpose described herein. For example, in addition to LF Comm. and other RF based methods, sound, light, etc. could also be used to generate a signal. The encoded magnetic signal generator circuit 149 includes an encoder transistor 149A with a base connected to conductor 148, an emitter connected to ground, and a collector connected to one terminal of an inductor 400. The other terminal of the inductor 400 is connected to a voltage source+V. This inductor in relation with transistor 149A produces a "boosted" LF signal. Capacitor 106 resonates at the LF frequency 125 KHz to produce the magnetic coupling signal. The inductor 149B may have a value of, for example, 9 mH; and the capacitor 106 may have a value of, for example, 150 pF. The capacitor 106 tunes an emitter signal 150 emitted from the inductor 149B. Using the exemplary values above, the equation:

$$f_o = [2\pi\sqrt{(LC)}]^{-1}$$

where $f_o$ denotes the resonance frequency, the frequency of the emitter signal 150 generated by the encoded magnetic signal generator circuit 149 is around 125 kHz. However, the inductor 149B and the capacitor 106 values may be designed above 125 kHz to compensate for some other non-ideal effects in the encoded magnetic signal generator circuit 149.

Figure 5:
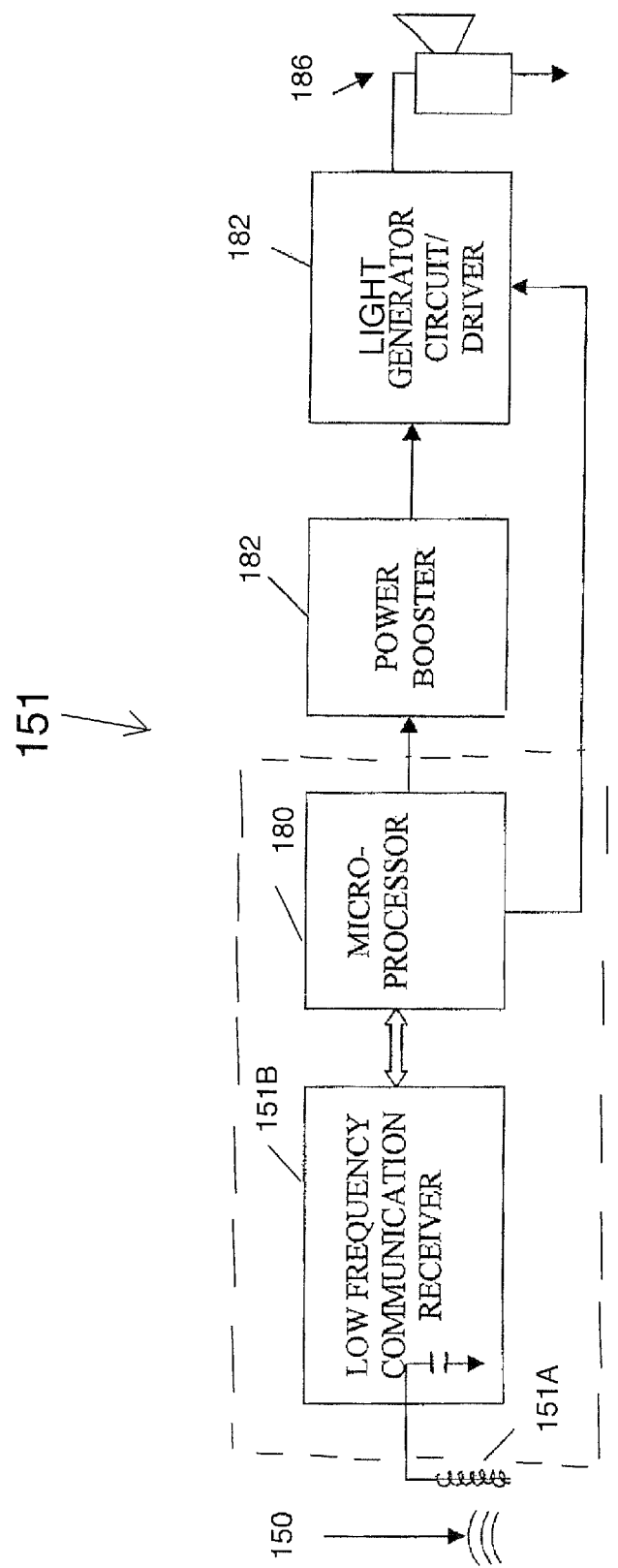
FIGS. 5 and 6 are block diagrams of accessory devices for the remote animal training system of FIG. 2.
Figure 6:
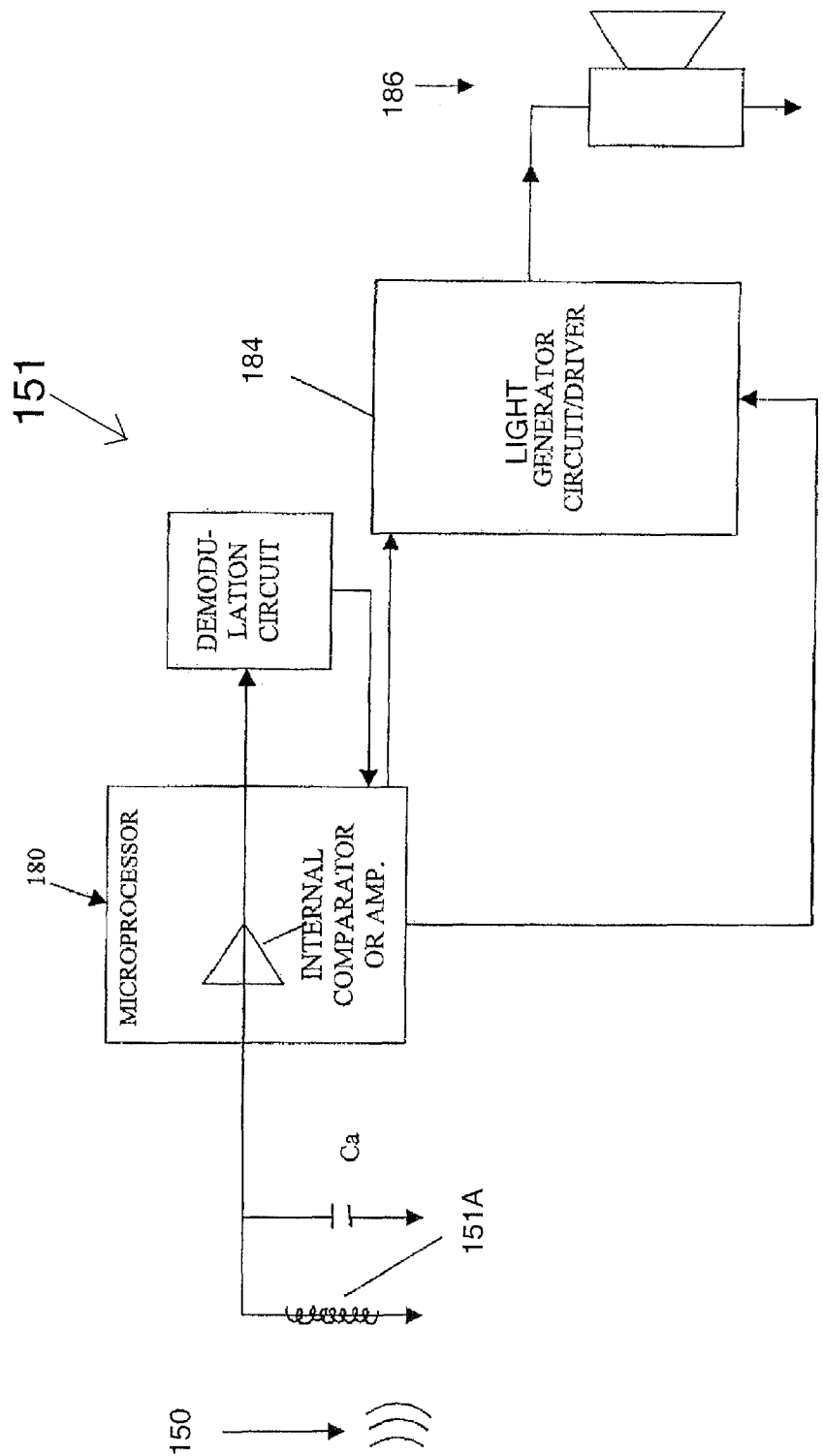

FIGS. 5 and 6 are block diagrams of an accessory device 151 for the remote animal training system 110A of FIG. 2. The accessory device 151 includes an accessory inductor 151A receiving the emitter signal 150 from the encoded magnetic signal generator circuit 149. The accessory inductor 151A is connected to a low frequency communication receiver 151B, which in one embodiment is incorporated into an accessory microprocessor 180. Alternatively, the low frequency communication receiver 151B may be separate from the accessory microprocessor 180. The accessory microprocessor 180 may control a number of possible accessories, including a light generation circuit 184 of the low frequency communication receiver 151B. Accessory microprocessor 180 is connected to the light generation circuit/driver 184. The light generation circuit/driver 184 is connected to an LED or other light emitter 186.

Figure 7:
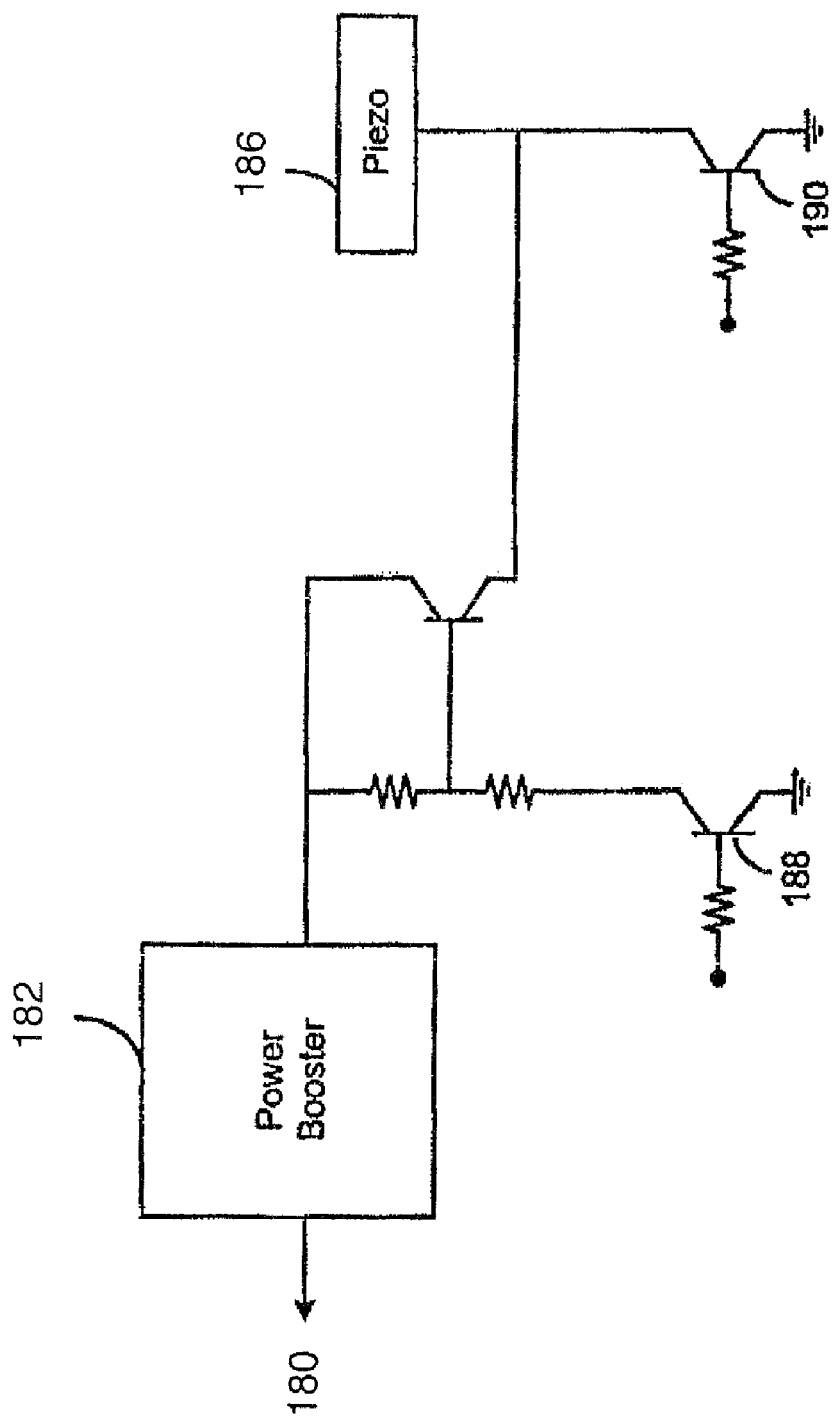
FIG. 7 is a block diagram of a portion of the accessory device for the remote animal training system of FIG. 2.

FIG. 7 is a block diagram of a portion of the accessory device 151 for the remote animal training system 110A of FIG. 3 in accordance with one embodiment of the present disclosure.

Figure 8:
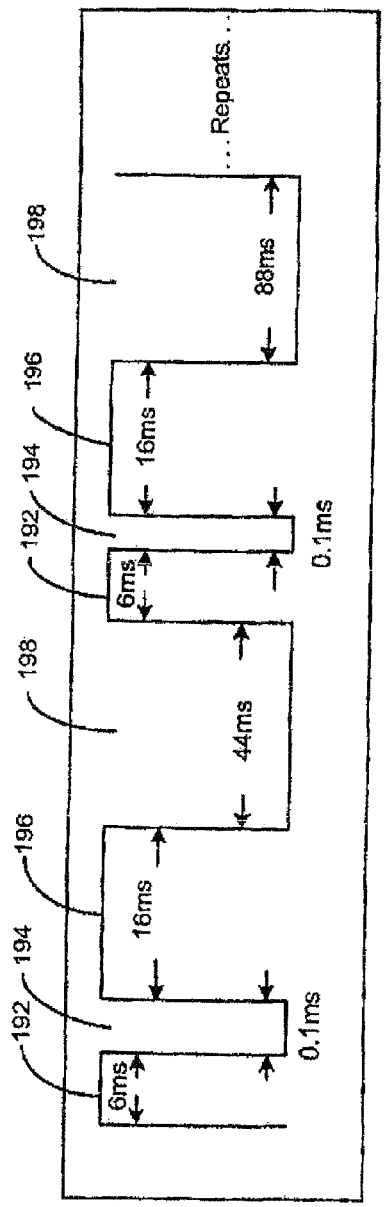
FIG. 8 is an illustration of an emitter signal for the light module accessory device for the remote animal training system of FIG. 2.

FIG. 8 is an illustration of an emitter signal 150 for the accessory device 151 for the remote animal training system 110A of FIG. 3. The emitter signal 150 produced by the encoded magnetic signal generator circuit is a square wave. The emitter signal 150 is initially primed with a preamble signal 192 that contains an initial preamble 125 kHz square wave that lasts for 6 ms. When a signal of this time duration or greater is initially detected, the accessory device 151 prepares to receive more data from the corresponding transmission There is a 0.1 to 0.5 ms of gap time 194 right after the preamble signal 192. After that, the encoded magnetic signal generator circuit 149 sends out the first sequence of data 196 with "0"s and "1"s for 16 ms duration followed by 44 ms of wait time 198. The data sequence then repeats with another 6 ms preamble, followed by 0.1 ms of wait time and a second sequence of "0"s and "1"s. This second sequence of "0"s and "1"s is actually the sequence processed by the accessory device 151. The second sequence of "0"s and "1"s is followed by 88 ms of wait time 198 before the sequence is repeated.

Figure 9:
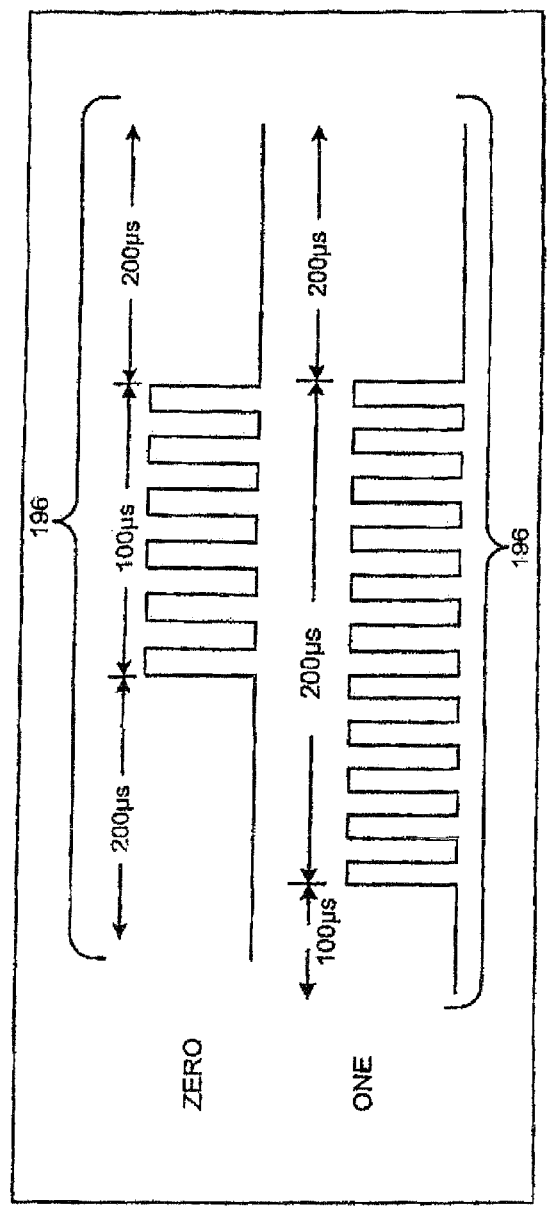
FIG. 9 is an illustration of a portion of the emitter signal of FIG. 6 for the remote animal training system of FIG. 2.
Figure 10:
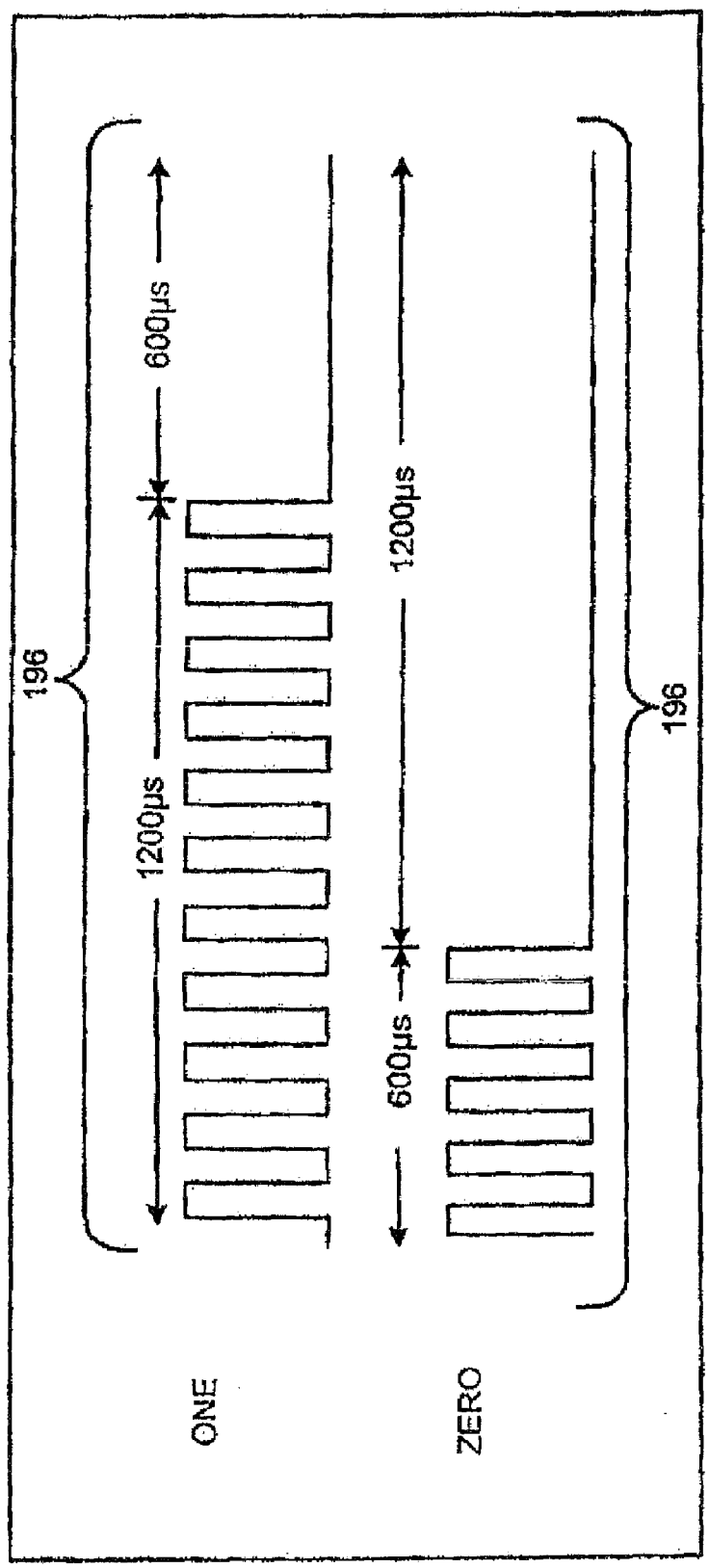
FIG. 10 is an illustration of a portion of the emitter signal of FIG. 6 for the remote animal training system of FIG. 2.

FIG. 9 is an example of one type of an LF communication signal, and illustrates a portion of the emitter signal 150 of FIG. 10 for the remote animal training system 110A of FIG. 2, in accordance with the second exemplary embodiment of the present invention. FIG. 9 is operative for explaining the sequence of data 196 shown in FIG. 8. As shown in FIG. 9, a "0" is represented by a 0.2 ms long flat line, followed by a 0.1 ms long 125 kHz square wave, and ended with a 0.2 ms long flat line. A "1" is represented by a 0.1 ms long flat line, followed by a 0.2 ms long 125 kHz of square wave, and ended by a 0.2 ms long flat line. Hence, each data bit, whether a "1" or a "0" is 0.5 ms long. There are a total of 32 bits (16 ms of 0.5 ms bits) in the data sequence 196 (4 bits for MSB, 4 bits for LSB, 4 bits for FUNCTION and 4 bits for CHKSUM). Thus, a 16 ms data sequence 196 is transmitted.

With respect to FIG. 9, depending upon the sensitivity of the receiver and the environmental conditions relative to transmission of the emitter signal 150, it may be worthwhile to provide fewer, longer bits within the 16 ms data sequence 196 to provide a more reliable system. For instance, using a system similar to that disclosed in FIG. 9, a total of 8 bits, each up to 2.0 ms long, may be transmitted during the 16 ms data sequence 196. Further, other patterns, e.g., ⅓-⅔ long modulations, may be available for providing a "1" or a "0" as detailed above.

FIG. 10 is an illustration of a portion of the emitter signal 150 of FIG. 2 and of the signal shown in FIG. 8 for the remote animal training system 110A of FIG. 2. FIG. 10 is one of many possible alternatives to the illustration of FIG. 9 and is operative for explaining the sequence of data 196 shown in FIG. 8. As shown in FIG. 10, a "0" is represented by a 0.6 ms long 125 kHz square wave and a 1.2 ms long flat line. A "1" is represented by a 1.2 ms long 125 kHz of square wave a 0.6 ms long flat line. Hence, each data bit, whether a "1" or a "0" is 1.8 ms long. There are a total of 8 bits (16 ms of 1.8 ms bits, with 1.6ms to spare) in the data sequence 196. Thus, a 16 ms data sequence 196 capable of 256 different commands ($2^8$) is transmitted.

The emitter signal 150 represents a command the LF receiver (up to 256 commands are possible). Typically, no addressing is required because of the short range of the magnetic coupling. Commands would appear as addresses for accessory units that only are capable of activating only one response to a command. For example, an accessory unit that only produces an electrical stimulation of a specific intensity level (specific frequency and Vrms value) when it sees the specific command, will not respond to any other command, therefore, the command also appears as an address. There might be accessory units that respond to multiple commands but only when the specific (1 of the 3) 8-bit command is decoded. Other accessory units will respond to a specific command that will activate one of several hardware selected (switch) outputs of the unit. While accessory device 151 is on, it operates in a mode selected by internal DIP switches (not shown). In one selectable mode, if the accessory device 151 is a beeper, two different beeping patterns correspond to two different animals. In another selectable mode, light is emitted only when an ambient light detector within the accessory device 151 detects low levels of light surrounding the animal. The accessory unit also could comprise a strobe, vibration or electric stimulation device.

Figure 11:
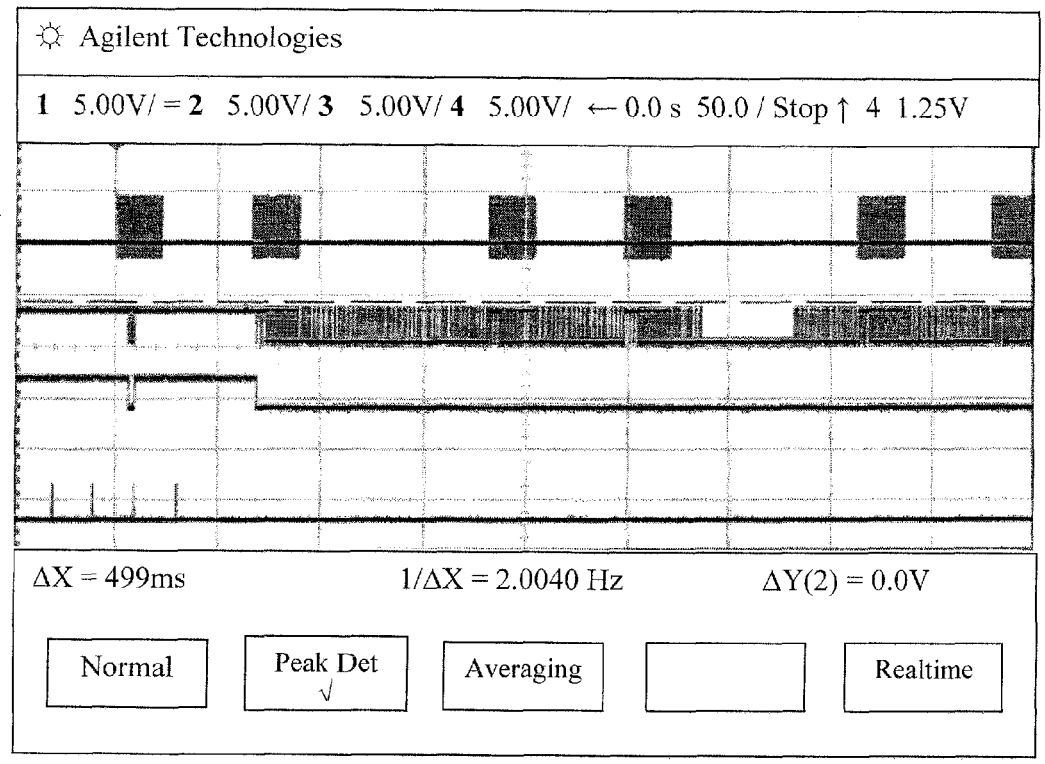
FIG. 11 illustrates actual captured signal in accordance with an embodiment of the present disclosure.
Figure 12:
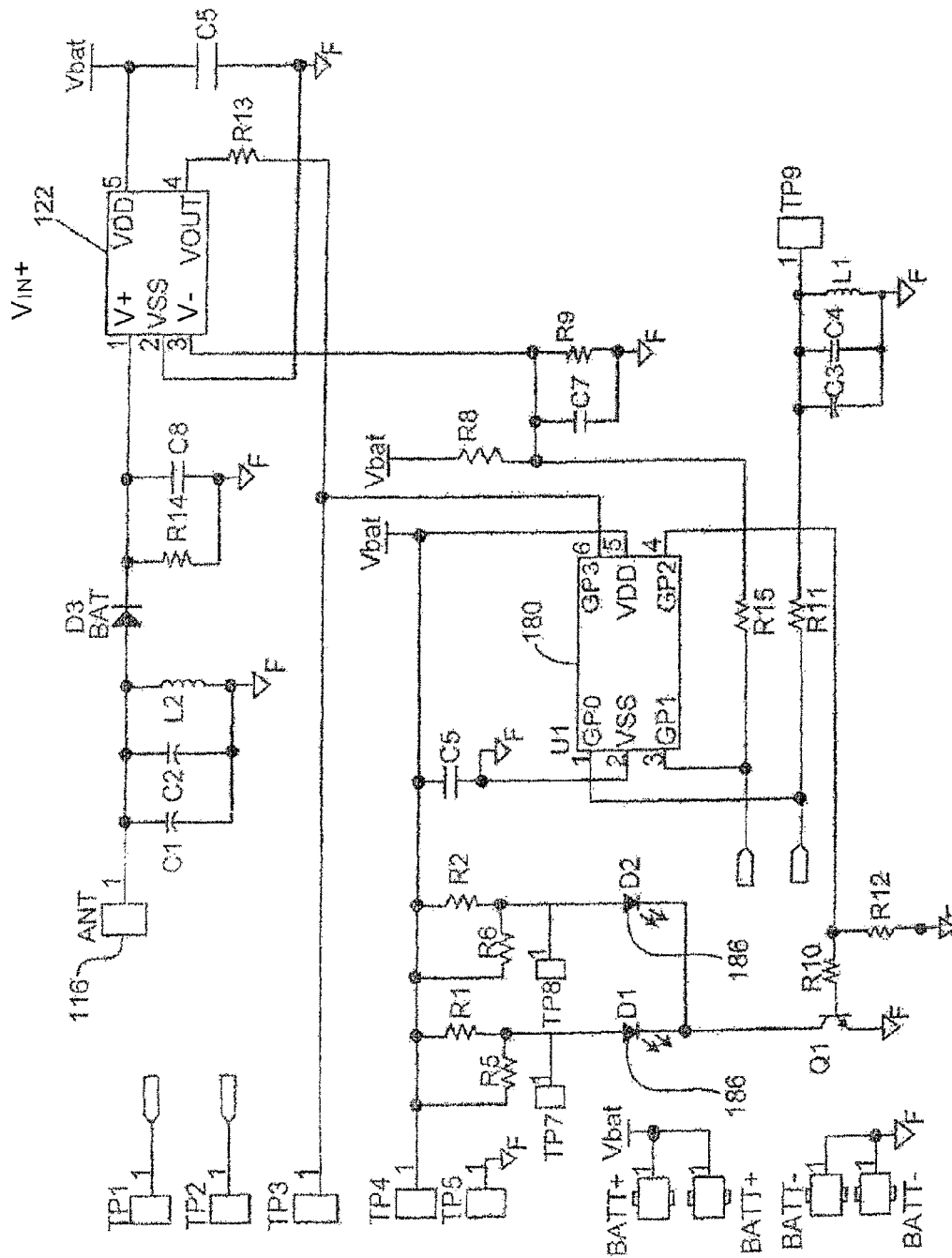
FIG. 12 is a schematic of a circuit to enact the present disclosure.

FIG. 11 illustrates actual captured signal in accordance with a second exemplary embodiment of the present invention.

An LF Comm Transmitter will automatically transmit a minimum of 4 packets of data with a button press from the remote transmitter. The data is modulated at 125 kHz. Detection of 2 valid packets will activate or deactivate the accessory unit. The decoding of packet data is performed by a microprocessor interfaced to the LF Comm receiver chip by 3 lines (UPLND_DATA, UPLND_WAKE, and UPLND_RST (reset)). Activation (or deactivation) requires a minimum of 2 falling edge signals (from VCC to Ground) on the UPLND_WAKE line into the microprocessor within 100 ms of each other. The LF Comm receiver will output a low on the UPLND_WAKE line when a preamble is detected (minimum 5.64 ms Preamble duration) through the receiver antenna input. FIG. 9 illustrates the activation of the accessory function.

As seen in the FIG. 11, the UPLND_WAKE line is normally high until a preamble is detected. Once the first packet is detected, the microprocessor will reset the LF Comm receiver chip by pulsing the RESET line (Bottom Signal—CH3). If a second preamble signal is detected within 100 ms of the first, the UPLND_WAKE will again go low and the microprocessor will activate the accessory function (or deactivate). After the second preamble detection, data will be available at the UPLND_DATA (second signal from top—CH2) line for command decoding. If a second falling edge signal at the UPLND_WAKE line within 100 ms of the first, the accessory function will fail to activate (or deactivate) and the activation process will be reset and 2 more valid preamble signals will be expected to activate or deactivate the accessory function of the accessory unit.

While the above description relates to a light-emitting type of accessory device, it should generally be understood that this circuit is generally applicable to accessory devices that emit sound (substituting, e.g., the LED 186 out for a piezoelectric transducer 186) or the like. The improvements over the art described in any of the embodiments above may be added or excluded in several different combinations, and no description is intended to limit this disclosure to only the combinations described herein. Similarly, signal lengths, frequencies, and amplitudes are provided for exemplary purposes only and are not intended to limit the scope of the invention.

In another embodiment, the light module is activated by detecting a radio frequency (RF) transmission. In this embodiment, the user's animal training system 110A (FIG. 3) need not comprise an existing accessory channel to allow remote activation of the light module 10 (FIG. 1*b*) accessory by an existing animal training system. The user would simply hold the transmitter antenna 114 (FIG. 3) close (within a few inches to the module 10—FIG. 1*b*) and the lights 186 (FIG. 5) would illuminate. The light module 10 (FIG. 1*b*) would detect the transmission of an RF signal 108 (FIG. 3) and would activate the lighting circuit accordingly. In a particular embodiment, one LF Comm or RF transmission will cause the unit to flash twice every three seconds, another transmission will cause it to glow steady and a third transmission will cause the lights to go out.

If desired, the light accessory module 10 (FIG. 1*b*) will have a separate main power on/off switch (not shown), and will be powered by the same battery as the receiver to which it is attached. Alternatively, the light accessory module will be turned on by the receiver main power switch, in which case the light accessory module 10 (FIG. 1) will be designed to draw very low (>100uA) standby current, so that the LED's 186 (FIG. 5) can be switched on remotely. The screws 16 (FIG. 1*b*) that mount the light module to the receiver may be provided as a part of what the user receives when they purchase the device. The screws 16 (FIG. 1*b*) are the same size and threading of the existing receiver battery screw, but are long enough to thread through the battery 14 (FIG. 1*b*) and the module into the receiver 12 (FIG. 1*b*) and provide sufficient torque to effect a seal.

FIG. 10 shows a typical circuit structure used for one embodiment of the invention. Signal 108 (FIG. 2) is received at antenna 116 (FIG. 2) and instructions processed to determine the behavior of LEDs 186 (FIG. 5).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, the accessory unit may be packaged as a stand-alone device with electronic circuits for activation/deactivation of the light, control of flash, rate, color, or both, and may also include a monitor sensor, accelerometer, heart rate monitor, electronic compass or GPS system as above described. Also, if desired, the LED(s) may be mounted directly to the circuit boards, and made visible through a transparent window in the device housing or the device housing may be formed from a transparent or translucent material. The accessory unit also comprises two or more devices such as a strobe and an electric stimulation device, which may be separately addressable. Also, two or more separately addressable accessory units may be worn on a single animal. Additionally, the accessory device may include other functionality such as GPS functionality. Still other modifications are contemplated. For example, one having skill in the art may recognize that communications between the transmitter and receiver may be accomplished through methods besides those listed above. All such modifications and variations are intended to be included herein within the scope of this disclosure and the present invention and protected by the following claims.

What is claimed is:

1. A light accessory for a remotely controlled animal training system having a battery and a receiver, comprising:
    a light source;
    a connection to couple the light source to the battery of the animal training system; and
    a control to selectively power the light source and to enable various lighting patterns, all in a water resistant housing, wherein the water-resistant housing includes reflective material.

2. The light accessory of claim 1, wherein the light source comprises light emitting diodes.

3. The light accessory of claim 1, further comprising a detector that activates the light source in the presence of a proximate radio frequency transmission.

4. The light accessory of claim 1, wherein the light source is a strobe light system.

5. The light accessory of claim 1, wherein the light source control includes a circuit which draws a standby current of less than about 100 uA.

6. The light accessory of claim 1, wherein the control is responsive to an existing accessory channel in the receiver.

7. The light accessory of claim 6, wherein the accessory channel responds to a magnetic coupled-transmission.

8. The light accessory of claim 1, wherein the light source comprises light emitters of more than one wavelength.

9. The light accessory of claim 8, wherein the light emitters include light emitters in the infrared spectrum.

10. The light accessory of claim 8, wherein the light emitters are remotely controlled.

11. The light accessory of claim 1, further comprising a sensor coupled to the control, wherein the control responds to information received from the sensor.

12. The light accessory of claim 1, wherein the connector is an e-collar and the light accessory is coupled to the e-collar remote to the battery and the receiver.

13. A method of activating an accessory on a remotely controlled animal training system comprising:
    providing a radio frequency transmitter remote from the light accessory;
    transmitting a radio frequency signal from the transmitter to the accessory;
    detecting the radio frequency transmission; and activating or deactivating the accessory in response to the presence of the detected transmission, wherein the accessory is mounted on an animal.

14. The method of claim 13, wherein the accessory is a light accessory.

15. A receiver, configured to be used in a remotely controlled animal training system comprising:
   a wireless receiver capable of receiving a wireless signal from a wireless transmitter;
   a demodulator in communication with the wireless receiver, wherein demodulating the wireless signal produces a digital signal;
   a control server in communication with the demodulator for receiving the digital signal from the demodulator and producing a pulse signal therefrom; and
   a light accessory configured to activate and deactivate in response to a signal from the control server, wherein the receiver is collar mounted on an animal.

16. The receiver of claim 15, wherein the receiver is an RF/magnetic coupled receiver.

17. The receiver of claim 15, wherein the wireless receiver detects the presence of a proximate RFID transmitter and creates instructions for the microprocessor in response to the detected RFID transmission.

18. The receiver of claim 15, wherein the wireless receiver is encoded such that the light accessory will flash or shine continuously when activated.

19. The receiver of claim 15 wherein the light accessory emits light of a selected wavelength.

20. The receiver of claim 15 further comprising a motion detector coupled to the microprocessor such that the light accessory is activated when the receiver begins moving or when the receiver stops moving.

21. A light accessory for a remotely controlled animal training system having a battery and a receiver, comprising:
   a light source;
   a connection to couple the light source to the battery of the animal training system; and
   a control to selectively power the light source and to enable various lighting patterns, wherein the connector is an e-collar and the light accessory is coupled to the e-collar remote to the battery and the receiver.

22. The light accessory of claim 21, wherein the light source comprises light emitting diodes.

23. The light accessory of claim 21, further comprising a detector that activates the light source in the presence of a proximate radio frequency transmission.

24. The light accessory of claim 21, wherein the light source is a strobe light system.

25. The light accessory of claim 21, wherein the light source control includes a circuit which draws a standby current of less than about 100 uA.

26. The light accessory of claim 21, wherein the control is responsive to an existing accessory channel in the receiver.

27. The light accessory of claim 26, wherein the accessory channel responds to a magnetic coupled-transmission.

28. The light accessory of claim 21, wherein the light source comprises light emitters of more than one wavelength.

29. The light accessory of claim 28, wherein the light emitters include light emitters in the infrared spectrum.

30. The light accessory of claim 28, wherein the light emitters are remotely controlled.

31. The light accessory of claim 21, further comprising a sensor coupled to the control, wherein the control responds to information received from the sensor.

32. A receiver, configured to be used in a remotely controlled animal training system comprising:
   a wireless receiver capable of receiving a wireless signal from a wireless transmitter;
   a demodulator in communication with the wireless receiver, wherein demodulating the wireless signal produces a digital signal;
   a control server in communication with the demodulator for receiving the digital signal from the demodulator and producing a pulse signal therefrom; and
   a light accessory configured to activate and deactivate in response to a signal from the control server, further comprising a motion detector coupled to the microprocessor such that the light accessory is activated when the receiver begins moving or when the receiver stops moving.

33. The receiver of claim 32, wherein the receiver is an RF/magnetic coupled receiver.

34. The receiver of claim 32, wherein the wireless receiver detects the presence of a proximate RFID transmitter and creates instructions for the microprocessor in response to the detected RFID transmission.

35. The receiver of claim 32, wherein the wireless receiver is encoded such that the light accessory will flash or shine continuously when activated.

36. The receiver of claim 32 wherein the light accessory emits light of a selected wavelength.

* * * * *